United States Patent [19]
Jung et al.

[11] Patent Number: 5,172,566
[45] Date of Patent: Dec. 22, 1992

[54] TEMPERATURE REGULATING APPARATUS FOR REFRIGERATORS

[75] Inventors: Yoon G. Jung; Young R. Yoon, both of Seoul, Rep. of Korea

[73] Assignee: Daewoo Electronics Co., Ltd., Seoul, Rep. of Korea

[21] Appl. No.: 744,074

[22] Filed: Aug. 12, 1991

[30] Foreign Application Priority Data

Oct. 24, 1990 [KR] Rep. of Korea .................... 90-17089

[51] Int. Cl.⁵ .............................................. F25D 17/04
[52] U.S. Cl. ...................................... 62/186; 62/187; 236/78 C
[58] Field of Search ............... 62/186, 187; 236/78 C, 236/13

[56] References Cited

U.S. PATENT DOCUMENTS

| | | | |
|---|---|---|---|
| 4,640,183 | 2/1987 | Doi | 62/187 X |
| 4,688,393 | 8/1987 | Linstromberg et al. | 62/187 |
| 4,689,966 | 9/1987 | Nonaka | 62/187 |
| 4,741,170 | 5/1988 | Tershak | 62/187 X |
| 4,852,361 | 8/1989 | Oike | 62/187 X |

*Primary Examiner*—John Rivell
*Attorney, Agent, or Firm*—James D. Hall

[57] ABSTRACT

A temperature regulating apparatus for an air-circulated refrigerator is disclosed, capable of keeping the refrigeration room temperature constant by way of closely regulating the flow rate of cold air admitted into the refrigeration room. Also disclosed is a control device for controlling operation of the temperature regulating apparatus. Such a temperature regulating apparatus comprises a core member 50 either extendible to open up the cold air inlet port 12 or retractable to close off the same. A multiple turns of a coil 54 surrounds the core member 50 in order to produce a varying level of inductance i.e. an electrical signal proportional to the axial displacement of the core member 50. This electrical position signal is transmitted to a control device 20 which serves to control the operation of the damper flap actuator based on the temperature signal from a temperature sensor 22.

7 Claims, 12 Drawing Sheets

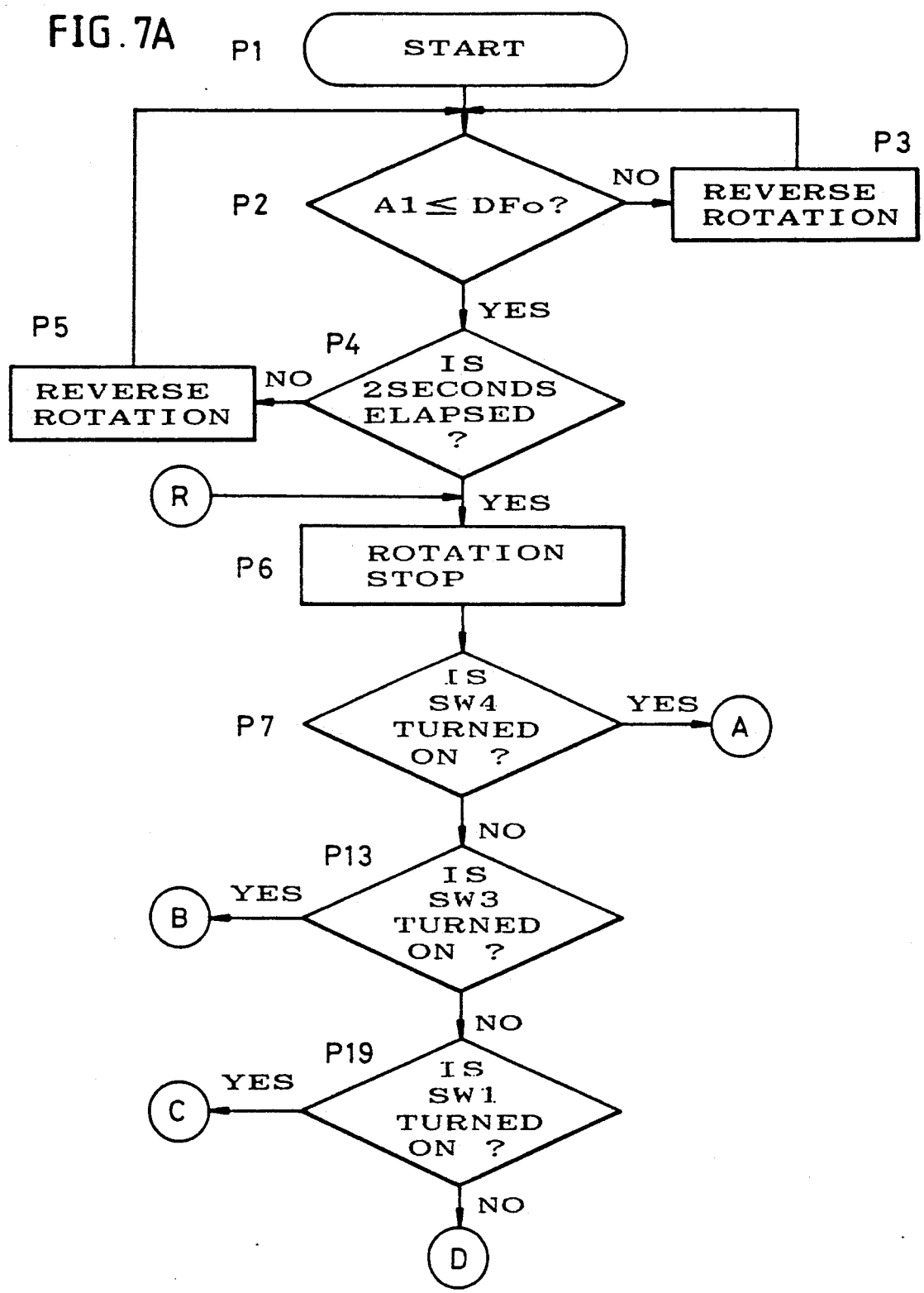

TEMPERATURE REGULATING APPARATUS FOR REFRIGERATORS

FIELD OF THE INVENTION

The present invention relates to an apparatus for regulating temperature within the refrigeration room or compartment of a refrigerator; and, particularly, to a temperature regulating apparatus for use in an air-circulated refrigerator which is designed to keep the refrigeration compartment temperature constant by virtue of allowing a controlled amount of cold air to circulate through the compartment. More specifically, the present invention is directed to a control device for the temperature regulating apparatus and a method of controlling same.

DESCRIPTION OF THE PRIOR ART

Conventional refrigerators for storing foodstuff at a lower temperature are often categorized into a couple of distinct groups: direct-cooling refrigerators wherein the refrigerating action is carried out through the heat exchange between the inside air and the refrigerant tube distributed on the respective walls of the refrigeration compartment; and indirect-cooling or air-circulated refrigerators wherein a varying amount of cold air from a freezer is introduced into and then circulated through the refrigeration room in an intermittent or continuous manner. It is of paramount importance, in air-circulated refrigerators, that the flow rate of cold air is under a close control in order to minimize a temperature fluctuation within the refrigeration room and thereby prevent an early degradation of the foodstuff stored therein.

In the refrigerator industry, use has been made of a temperature regulation apparatus referred generally to as "damper" to control the cold air flow. Such a prior art device typically comprises a damper flap or baffle plate pivotably mounted through a lever on the rear wall of the refrigeration compartment for selectively opening or closing off the cold air inlet port and a damper flap actuator operable in response to the indoor temperature fluctuation for causing the damper flap to move toward or away from the inlet port. The damper flap is normally biased to a closed position by means of, e.g., a leaf spring.

It is well known in the art that four types of damper flap actuators have been, and currently are, used to cause a pivotal movement of the damper flap toward an open position against an elastic force of the leaf spring and the like.

A first type of actuator includes a regulation knob coupled with the damper flap so as to allow the user to regulate the pivot angle of the damper flap through a manual operation of the regulation knob. With this type of manual actuator, not only is it cumbersome to operate the regulation knob but also is it not feasible to provide a close control of the refrigeration room temperature.

Japanese Patent Publication No. Sho 63-13983 discloses a second type of actuator which comprises a sealed tube extending into the refrigeration room and containing a volume of heat-sensitive gas therein and a bellows responsive to the volumetric changes of the heat-sensitive gas for urging the damper flap toward an open position or allowing its restoration to a closed position. An increase in the refrigeration room temperature beyond a predetermined level will cause an expansion of the heat-sensitive gas, which in turn will be translated into a linear expansive movement of the bellows. This will make the opening angle of the damper flap larger, allowing a greater amount of cold air to be admitted into the refrigeration room. In contrast, a decrease in the refrigeration room temperature will result in a contraction or shrinkage of the heat-sensitive gas, which will enable the damper flap to move closer to, and may eventually close off, the inlet port. This type of actuator has a number of major drawbacks including the fact that it normally does not operate in an intimate response and with sufficiently keen sensitivity to the temperature changes.

A third type of actuator comprises a temperature sensor operable to generate an electrical signal indicating a temperature change in the refrigeration room and a solenoid which, in response to the electrical signal, selectively closes off or opens up the damper flap at a given angle. Such a solenoid type actuator operates to take either a first position wherein the damper flap assumes a fully opened position or a second position wherein the damper flap assumes a closed position. As a result, it is not possible for the solenoid type actuator to provide a multi-stage or linear control of the cold-air flow rate. Further, the solenoid device often creates a great deal of noises because of its activation/deactivation mode of operation.

A fourth type of actuator comprises a temperature sensor operable to generate an electrical signal indicating a temperature change within the refrigeration room, a reversible motor which, in response to the electrical signal, opens up or closes off the damper flap and a contact switch functioning to prevent the motor from further rotating when the damper flap reaches its fully opened or closed position. This type of actuator also has the deficiency of failing to provide an optimal temperature control, owing to its on/off mode of operation.

SUMMARY OF THE INVENTION

Accordingly, it is an object of the present invention to provide a novel damper flap actuator capable of controlling the opening angle of a damper flap in such a manner that a closely controlled or optimal amount of cold air is introduced into the refrigeration compartment of an indirectly-cooled or air-circulated refrigerator so as to minimize fluctuation and deviation of the refrigerator room temperature from a pre-determined target temperature.

Another object of the present invention is to provide a temperature regulating apparatus for an air-circulated refrigerator employing said damper flap actuator.

A further object of the present invention is to provide a control device for use in said temperature regulating apparatus to provide an optimal temperature control in a specific mode selected from multiple operation modes and a method therefor.

In one aspect of the present invention, there is provided an actuator for use in a temperature regulating apparatus of an air-circulated refrigerator, said refrigerator having a refrigeration room communicating with a cold air source through an inlet port formed on, e.g., the rear wall of the refrigeration room, said inlet port being closed by an operable damper flap, which comprises: a housing having a bottom wall, a side wall and a cylindrical boss extending vertically upwardly from the bottom wall about half the height of the side wall, said side wall terminating at its top end; a guide member having a flanged cylinder and an axial bore formed through the flanged cylinder, said guide member mounted on the top end of the side wall so that the flanged cylinder can be in a concentrically spaced-apart relationship with the cylindrical boss of said housing; a core member slidably fitted into the axial bore of said guide member for linear movement between a first position wherein the damper flap closes off the inlet port and a second position wherein the damper flap fully opens up the inlet port, said core member being operatively connected to the damper flap; a core driver for causing an axial movement of said core member to move between the first and the second positions; a coil wound around the flanged cylinder for generating a position signal proportional to the axial displacement of said core member; means for generating a temperature signal indicative of the actual temperature within said refrigeration room; and means for, in response to position and temperature signals, controlling the operation of said core driver to permit a controlled amount of cold air to flow into said refrigeration room.

In another aspect of the present invention, there is provided a control method for operating a damper flap actuator for use in a temperature regulating apparatus of an air-circulated refrigerator, said refrigerator having a refrigeration room communicating with a cold air source through an inlet port formed on, e.g., the rear wall of the refrigeration room, the actuator being operatively connected to a damper flap and operable in a specific mode selected from multiple modes of operation, said actuator comprising means for generating an electrical signal indicative of an opening angle of the damper flap, which comprises the steps of: (a) detecting the mode of operation selected; (b) testing at the selected mode if the actual temperature within the refrigeration room is higher than a reference temperature; (c) if so, causing the damper flap to pivot away from the inlet port until the magnitude of the electrical signal becomes equal to or larger than that of a reference signal generated at the selected mode; (d) if the actual temperature within the refrigeration room is lower than the reference temperature, allowing the damper flap to be pivoted toward the inlet port until the electrical signal becomes equal to or smaller than that of the reference signal; and (e) repeating the above-listed steps.

In a further aspect of the present invention, there is provided a control device for controlling the operation of a damper flap actuator for use in a temperature regulating apparatus of an air-circulated refrigerator, said refrigerator having a refrigeration room communicating with a cold air source through an inlet port formed on, e.g., the rear wall of the refrigeration room, the actuator being operatively connected to a damper flap and operable in a specific mode selected from multiple modes of operation, said actuator comprising motor means rotatable either in a first direction in which the damper flap is opened up or in a second direction in which the damper flap is closed off.

As shown in FIG. 5, the control device comprises a mode signal generation means for producing a mode signal to select one of the operation modes; a mode recognizing means for receiving the mode signal to recognize the selected operation mode; a selection signal generation means responsive to the recognized mode by said mode recognizing means to generate a selection signal which corresponds to the recognized mode; a temperature sensing means responsive to the selection signal for sensing the temperature within the refrigeration room at the recognized mode and generating a refrigeration room temperature voltage which corresponds to the sensed temperature; a reference voltage generation means for generating a reference voltage which corresponds to a reference or pre-determined temperature; a comparator means for comparing the refrigeration room temperature voltage with the reference voltage; a temperature deviation detector means responsive to an output of said comparator means for detecting the amount of deviation in the refrigeration room temperature from the reference temperature; a reference frequency generation means responsive to an output of said temperature deviation detector means for selectively generating a reference closure frequency which corresponds to the closure of the damper flap when the refrigeration room temperature is lower than the reference temperature and a reference opening frequency which corresponds to the recognized mode when the refrigeration room temperature is higher than the reference temperature; an actual frequency generation means for generating a frequency indicative of the actual opening angle of the damper flap which varies with the rotation of the motor means; an opening angle determination means for comparing the actual frequency with the reference frequency to determine the opening angle of said damper flap; a motor drive control signal generation means responsive to outputs of said temperature deviation detector means and said opening angle determination means for generating, when the refrigeration room temperature is higher than the reference temperature, a first rotational direction control signal for causing the motor means to rotate in a first direction until the frequency produced by said actual frequency generation means becomes equal to or higher than the reference opening frequency and for generating, when the refrigeration room temperature is lower than the reference temperature and the actual frequency is higher than the reference closure frequency, a second rotational direction control signal for causing the motor means to rotate in a second direction until the actual frequency becomes equal to or lower than the reference closure frequency; and a motor drive means responsive to the rotational direction control signal generated by said motor drive control signal generation means for rotating the motor means either in the first or the second direction. A single microcomputer will be able to perform the functions carried out by the mode recognizing means, the selection signal generation means, the temperature deviation detector means, the reference frequency generation means, the opening angle determination means and the motor drive control signal generation means.

BRIEF DESCRIPTION OF THE DRAWINGS

The above and other objects and features of the present invention will become apparent from the following description and the accompanying drawings wherein like reference numerals refer to like parts in different views.

FIGS. 7A–7E are flow charts, each showing a sequence of operations which are carried out by the microcomputer of the control device shown in FIG. 6.

DETAILED DESCRIPTION OF THE PREFERRED EMBODIMENT

Figure 1:
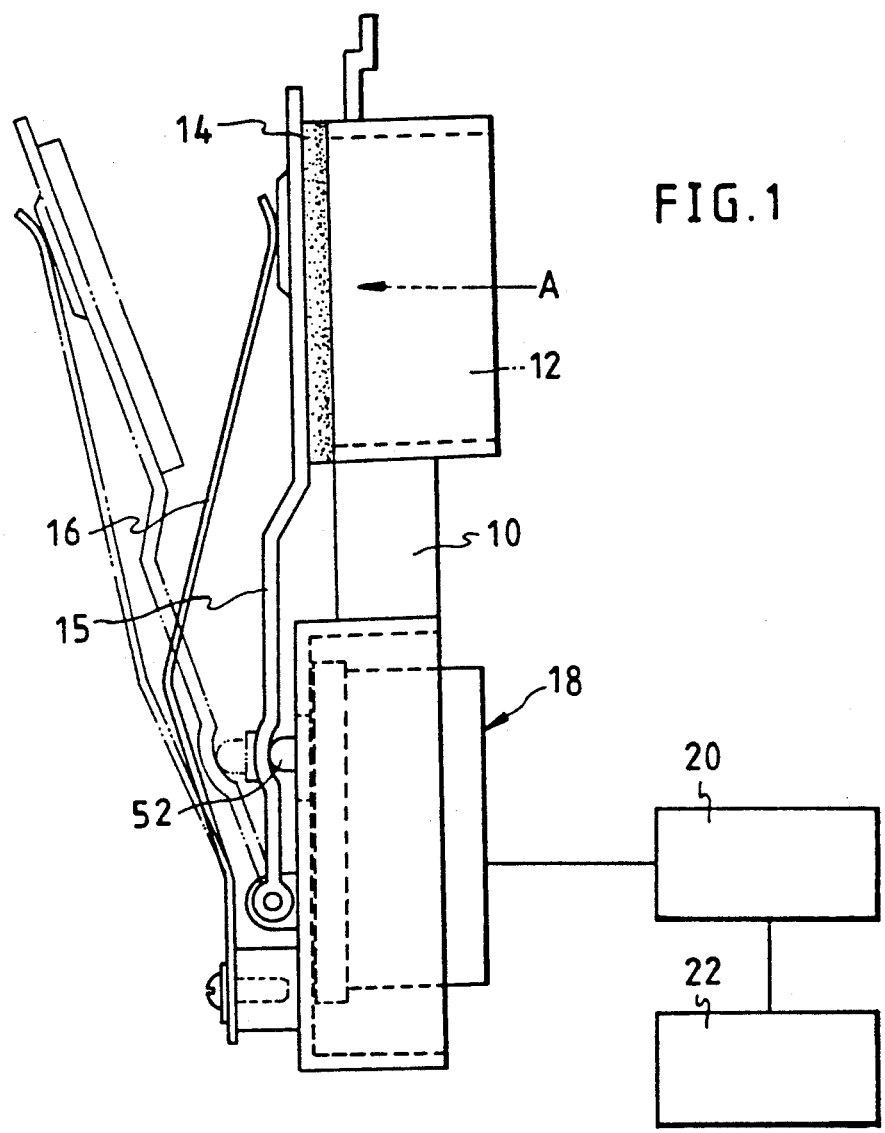
FIG. 1 is a schematic view of a temperature regulating apparatus incorporating the damper flap actuator in accordance with the present invention, with the damper flap left in its closed position.

Referring now to FIG. 1, there is shown a temperature regulating apparatus in accordance with the present invention, which is adapted to keep constant the temperature within a refrigeration room by way of either increasing or decreasing the flow rate of the cold air being introduced into the refrigeration room. The temperature regulating apparatus includes a damper flap 14 serving to close off or open up the cold air inlet port 12 formed through the rear wall 10 of the refrigeration room. The damper flap 14 is pivotably attached to the rear wall 10 of the refrigeration room through a lever 15 and normally biased toward the inlet port 12 by means of a leaf spring 16, for example.

Also mounted on the rear wall 10 is a damper flap actuator 18 encapsulated by a housing, which will be further described below with reference to FIGS. 2 to 4. The actuator 18 is associated with a control means 20 for controlling the operation of the actuator 18 in response to the electrical signal indicative of the actual temperature within the refrigeration room. Said temperature signal is supplied from a temperature sensor 22 exposed to the indoor air. The actuator 18 is operable to displace the damper flap 14 between a closed position blocking the air flow, as shown in a solid line in FIG. 1 and an opened position allowing the cold air to enter into the refrigeration room, as shown in a dotted line in FIG. 1.

As this is a typical arrangement of the temperature regulating apparatus for an air-circulated refrigerator, the details thereof are omitted from the description, for the sake of convenience and simplicity. Suffice it to say that the cold air from a freezer (not shown) is admitted into the refrigeration room through the inlet port 12 as indicated in arrow A in FIG. 1.

Figure 2:
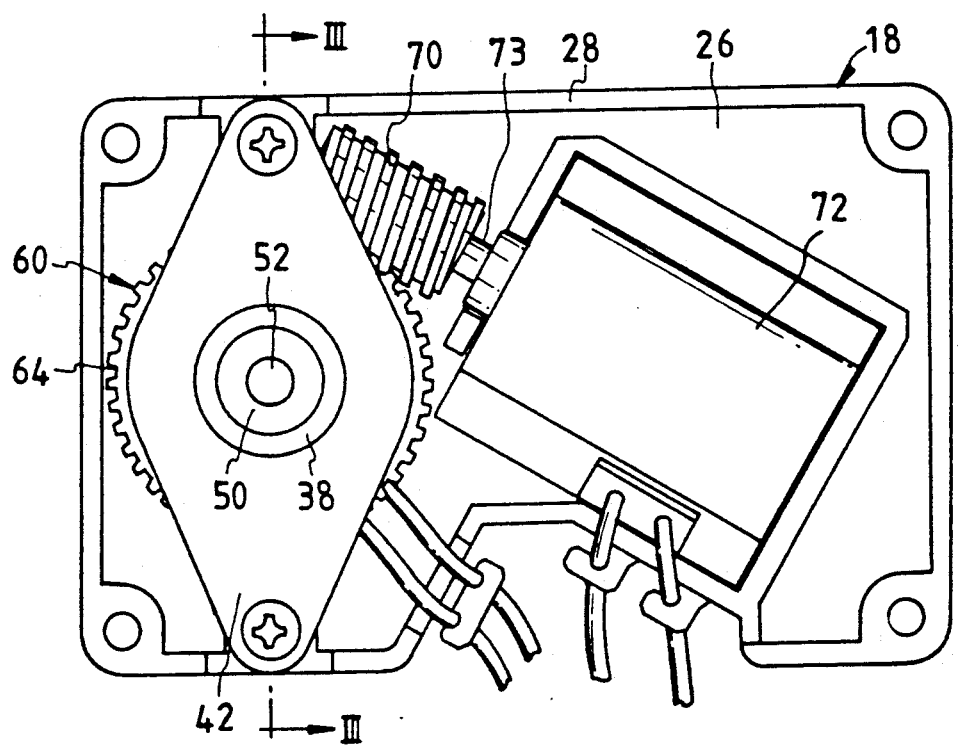
FIG. 2 is a top view showing the damper flap actuator in accordance with the present invention.
Figure 3A:
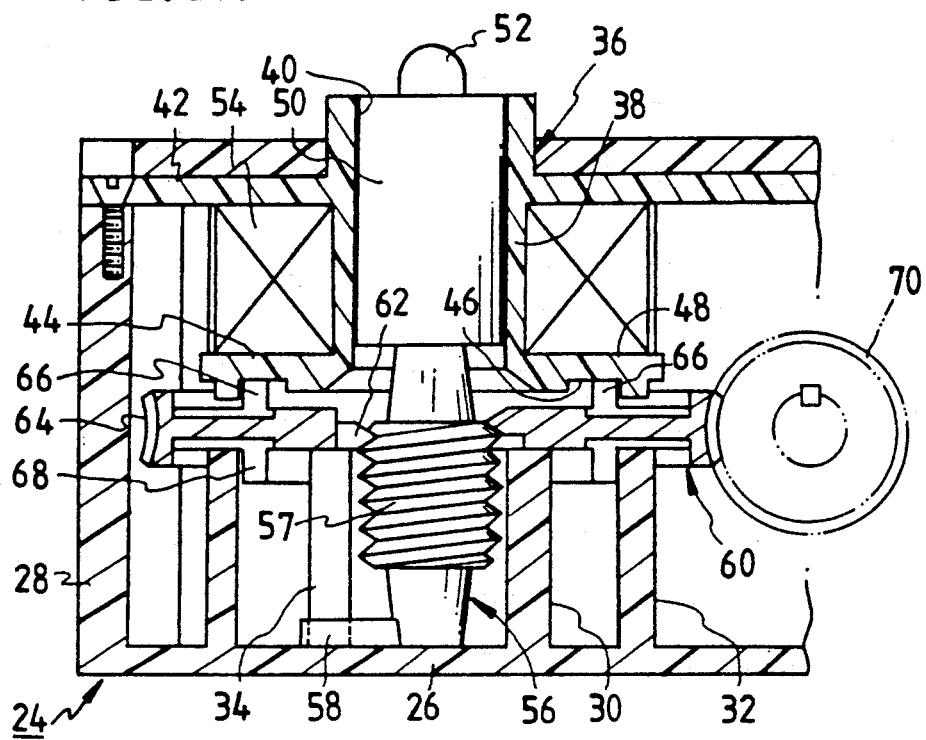
FIG. 3A is a sectional view taken along line III—III, showing the core member retracted to a first position in which the damper flap closes off the inlet port of the refrigeration room.
Figure 3B:
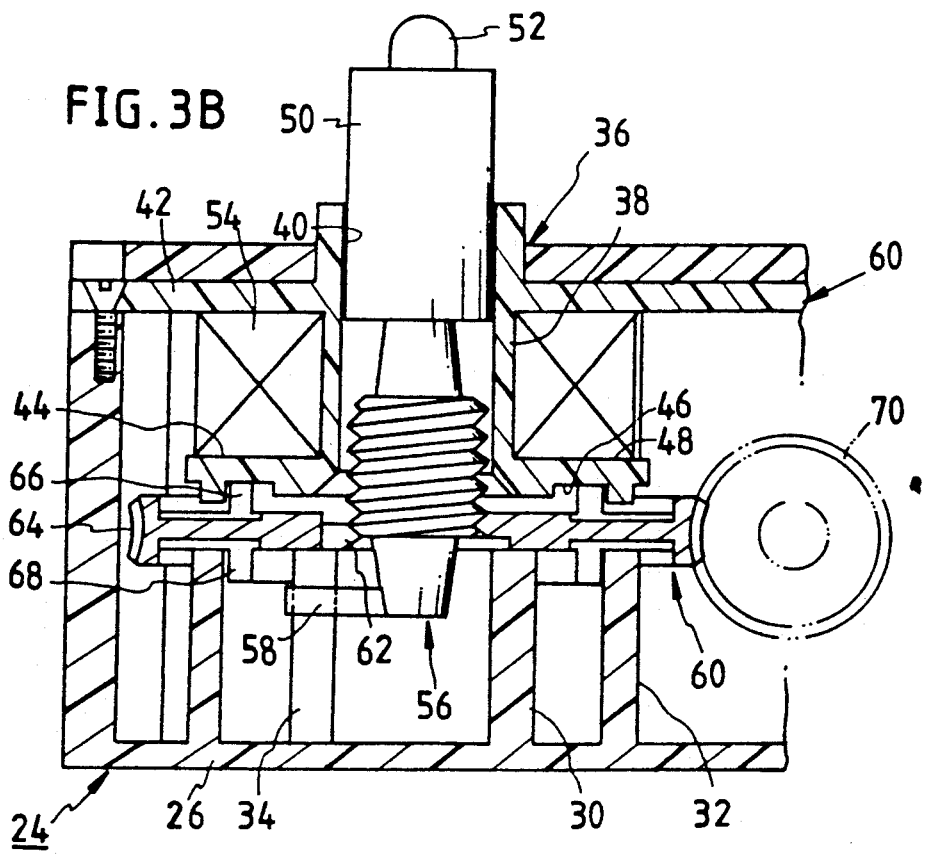
FIG. 3B is a view similar to FIG. 3A, with the core member extended to a second position in which the damper flap fully opens up the inlet port of the refrigeration room.
Figure 4:
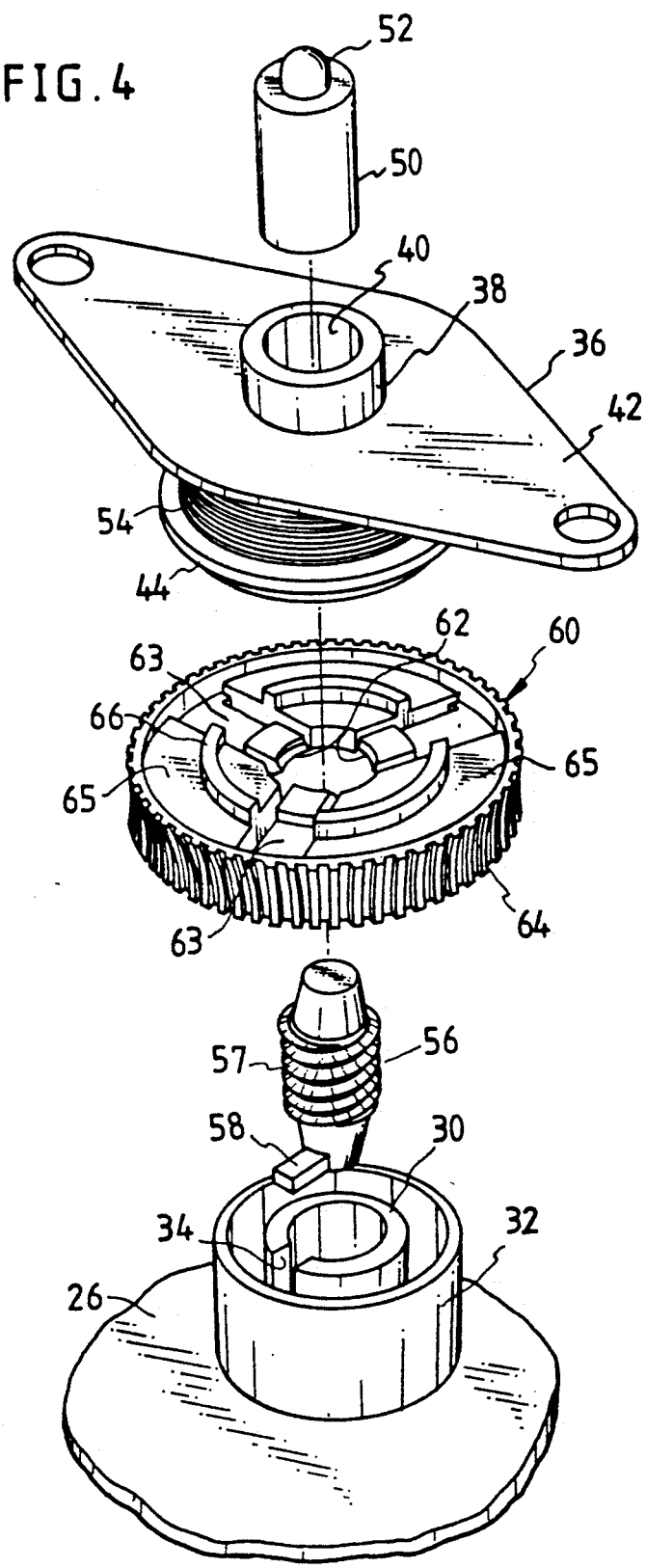
FIG. 4 is an exploded perspective view of the damper flap actuator in accordance with the present invention, portions thereof being removed for clarity.
Figure 5:
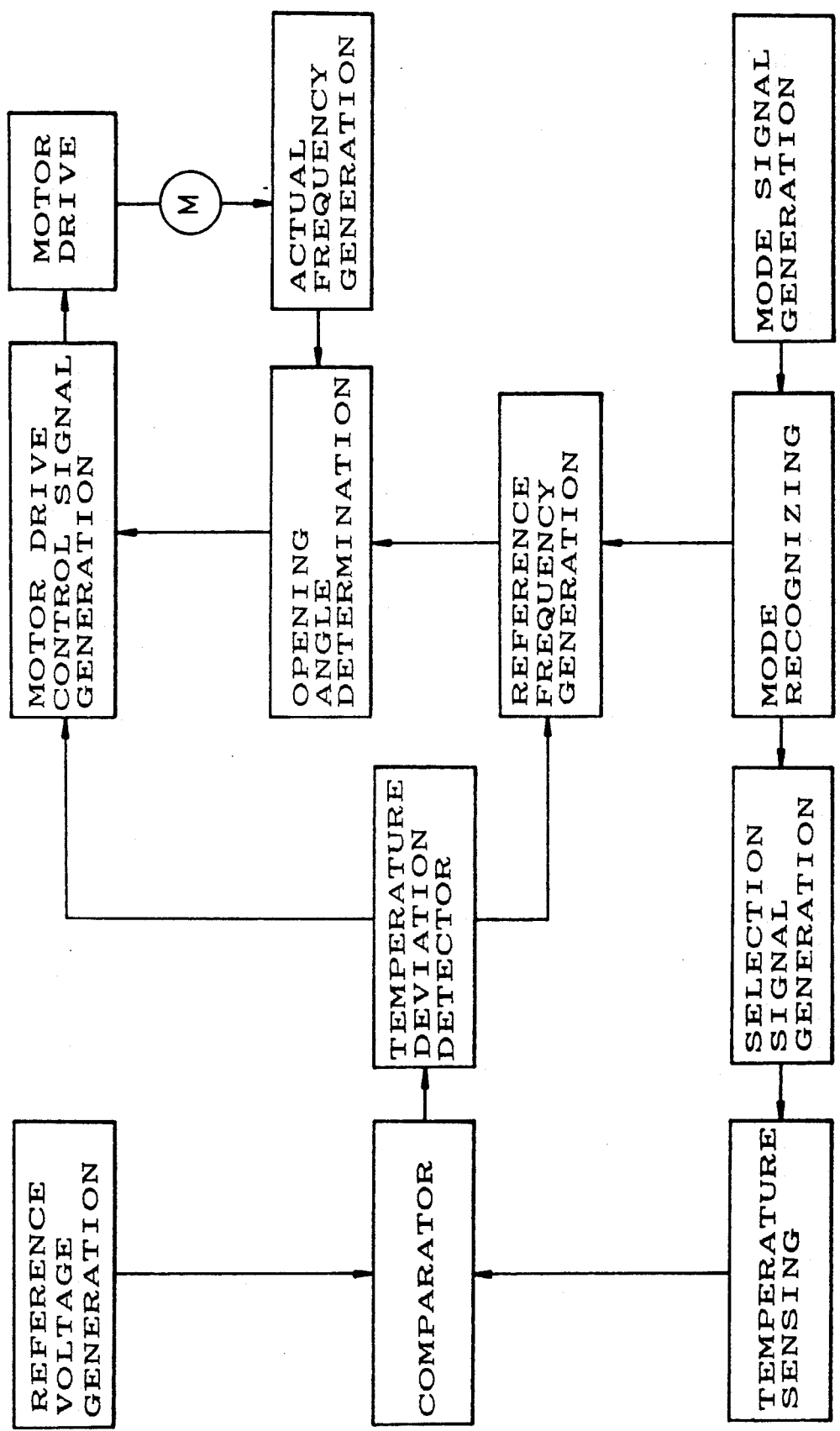
FIG. 5 shows an overall construction of the control device which is applicable to the temperature regulating apparatus as illustrated in FIG. 1.

Turning to FIG. 2 through FIG. 4, there is shown structural details of the damper flap actuator 18 of the present invention. The actuator 18 comprises a housing 24 which is provided with a bottom wall 26, a side wall 28 terminating at its top end, a cylindrical smaller diameter boss 30 extending vertically upwardly from the bottom wall 26 and, optionally, a cylindrical larger diameter boss 32 concentrical with and larger in diameter than the smaller diameter boss 30. It would be preferable that these cylindrical bosses 30 and 32 extend substantially half the height of the side wall 28 and are flushed with each other at their top ends. As best shown in FIG. 4, the smaller diameter boss 30 is provided with an axial slot 34 extending along the length thereof.

Releasably fastened on the top end of the side wall 28 is a guide member 36 which has a central cylinder 38 concentrically spaced apart from and faced to the smaller and the larger diameter bosses 30 and 32. The central cylinder 38 includes an axial bore 40 designed to slidably accommodate a core member 50 which is set forth below in detail. Further, the guide member 36 comprises an upper flange 42 extending radially outwardly from the central cylinder 38 in the vicinity of the top end thereof and a lower flange 44 extending from the bottom end of the central cylinder 38 in a direction similar to the upper flange 42. As clearly shown in FIG. 4, the upper flange 42 may take the form of, e.g., rhombus having its longitudinal ends bolted to the top end of the side wall 28. Unlike the upper one, the lower flange 44 is preferably of a circular shape and has an annular groove 46 formed on the lower surface thereof. The upper and lower flanges 42 and 44 cooperate to define a circumferential recess 48 around the central cylinder 38. While not shown in the drawings, the housing 24 may be hermetically sealed at its top opening by such suitable means as a plastic cover for the purpose of preventing the humid ambient air from penetrating into the housing 24, which would otherwise be a cause of mechanical trouble.

With reference to FIGS. 3 and 4, a core member 50 is slidably fitted into the axial bore 40 of the central cylinder 38. It should be appreciated that the core member 50 consists preferably of a permanent magnet having a rounded projection 52 at its end nearer to the damper flap 14 as best shown in FIG. 1. The core member 50 is linearly movable to a first position in which the damper flap 14 closes off the inlet port 12 and a second position in which the damper flap 14 fully opens up the inlet port 12.

As can be seen from FIG. 4, a multiple turns of coil 54 is wound around the circumferential recess 48 defined between the flanges 42 and 44 of the guide member 36. The coil 54 serves to generate a varying level of inductance which is proportional to the length of the core member 50 overlapped with respect to the coil 54. More specifically, retraction of the core member 50 to a position shown in FIG. 3A will maximize the degree of overlapping between the coil 54 and the core member 50, thereby producing a greatest level of inductance. In contrast, extension of the core member 50 to a position shown in FIG. 3B will lead to a reduction in the degree of overlapping and hence in the level of inductance. Such a position-dependent inductance is supplied to a control means 20 as an electrical signal indicative of the opening angle of the damper flap 14.

Concentrically attached to the lower end of the core member 50 is a threaded shaft 56 having an external thread formed along a limited length of the shaft 56. The threaded shaft 56 is provided with a radial tail 58 extending radially outwardly from the lower free end of the threaded shaft 56. As is apparent from FIG. 4, the tail 58 is engageable with the axial slot 34 of the smaller diameter boss 30. The tail 58 functions to allow the threaded shaft 56 and the core member 50 coupled therewith to displace in an axial direction within a limited range while preventing their rotational movement.

A worm wheel 60 is rotatably sandwiched between the cylindrical bosses 30 and 32 of the housing 24 and the lower flange 44 of the guide member 36. As shown in FIG. 4, the worm wheel 60 includes a turn of discontinuous internal thread 62 engaging with the external thread 57 of the threaded shaft 56 and a plurality of external teeth 64 meshing with a worm which will be explained below. Although the internal thread 62 is shown to have three segments 63, this if for illustrative purpose ony; and the actual number used can be either greater or fewer. In addition, the worm wheel 60 includes three sectors 65 alternating with and spaced apart from the segments 63. Each of the sectors 65 is provided with upper and lower arcuate ribs 66 and 68 projecting upwardly and downwardly from the opposite surfaces thereof. The upper ribs 66 extend into the annular groove 46 formed on the lower flange 44 of the guide member 36, whereas the lower ribs 68 project into the annular channel defined between the smaller and the larger diameter bosses 30 and 32.

Referring to FIG. 2, is can be seen that a worm 70 carried by a rotor shaft 73 of the reversible electric motor 72 meshes with the worm wheel 60 so as to transmit the driving force of the reversible motor 72 to the worm wheel 60 with a higher reduction ratio. Operation of the motor 72 is governed by a control device 20 which will be described below with reference to FIGS. 5 to 8. The rotational force generated by the motor 72 will be translated into an axially sliding movement of the core member 50 by a cooperative action of the worm wheel 60 and the threaded shaft 56.

Depending on the rotational direction of the reversible motor 72, the core member 50 either retracts to allow a pivotal movement of the damper flap 14 toward th inlet port 12 under a biasing action of the leaf spring 16 or extends to cause the damper flap 14 to pivot away from the inlet port 12, as illustrated in FIGS. 1 and 3. Such an axial displacement of the core member 50 is converted into an electrical position signal by the coil 54 and then supplied to the control device 20 together with an electrical temperature signal from the temperature sensor 22. Based on these electrical signals, the control device 20 can provide a closed loop control of the flow rate of the cold air being admitted into the refrigeration room.

Figure 6:
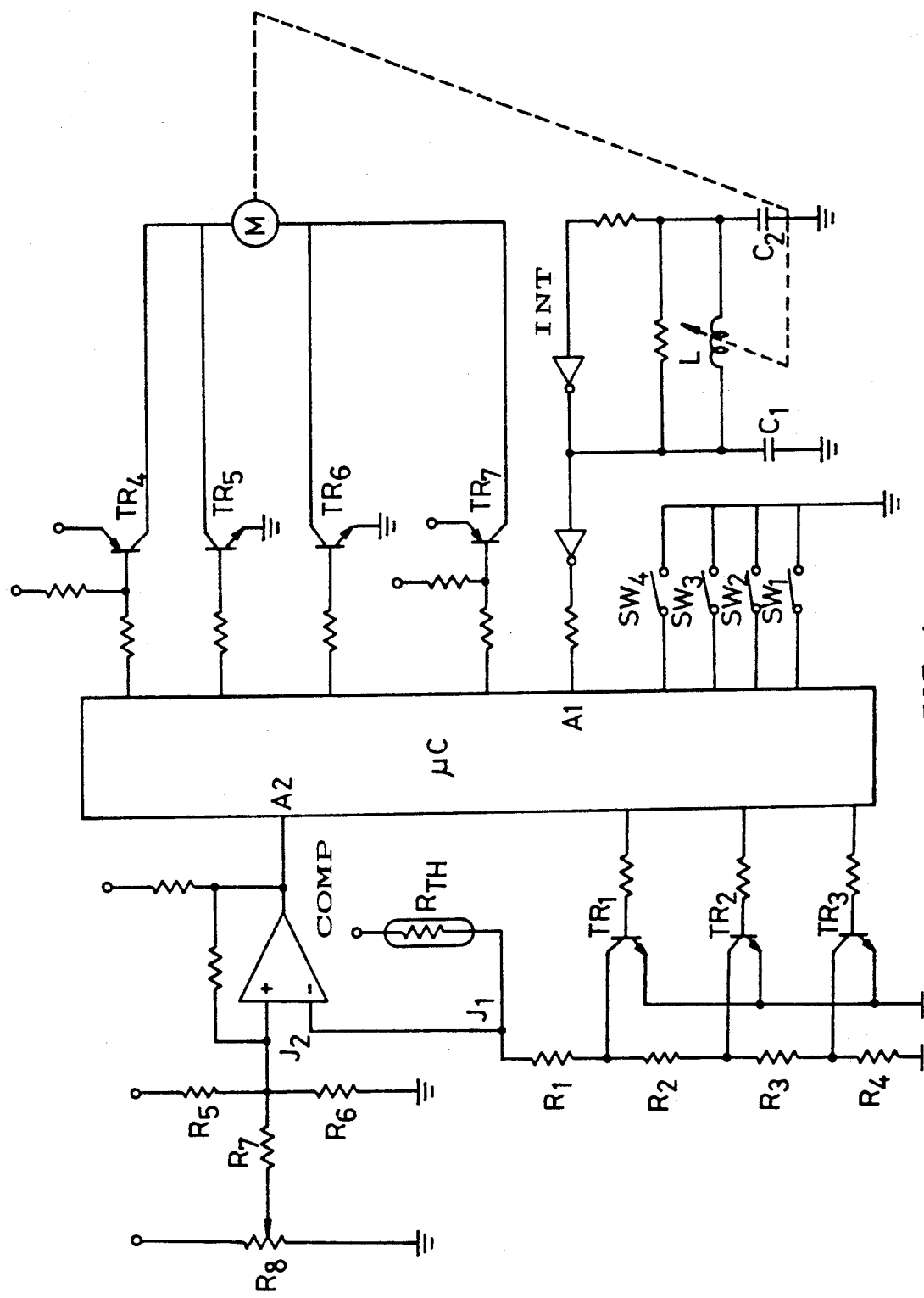
FIG. 6 illustrates an embodiment of the control device in accordance with the present invention.

Referring now to FIG. 6, the control device in accordance with the present invention is shown to have a mode signal generation means consisting of a plurality of switches SW1-SW4 which enable the user to select a specific operation mode of the damper flap actuator and hence of the temperature regulation apparatus. For the convenience of manipulation, these switches may be included in a control panel (not shown) which is usually located outboard the refrigerator.

It should be appreciated that the damper flap actuator is operable in one specific mode selected from a number of optional operation modes. Although it is theoretically possible to make the actuator operable in a plethora of modes, one skilled in the art may find it sufficient for the typical refrigerator to divide the operation modes into, e.g., three or four. The representative operation modes contemplated in the instant invention include a refrigerating mode in which the refrigeration room temperature is kept at the highest level, a cooling mode of a higher temperature level, a chilling mode of a lower temperature level and lastly, a freezing mode of the lowest temperature level.

The mode signal generation means constituting a part of the electrical circuitry shown in FIG. 6 is adapted to produce selectively a first mode signal to make the damper flap actuator operative in mode 1 when only the switch SW1 is turned ON, a second mode signal to make the damper flap actuator operative in mode 2 either when only the switch SW2 is turned ON or when all of the switches SW1-SW4 are turned OFF, a third mode signal to make the damper flap actuator operative in mode 3 when only the switch SW3 is turned ON, and a fourth mode signal to make the damper flap actuator operative in mode 4 when only the switch SW4 is turned ON. Each of the first to the fourth mode signals will be fed to and processed by the microcomputer $\mu C$ which will be described later.

A temperature sensing means comprises NPN transistors $TR_1$-$TR_3$, a thermistor resistor $R_{TH}$ and resistors $R_1$-$R_4$ electrically connected to each other as shown in FIG. 6. The temperature sensing means is adapted to detect the actual temperature within the refrigeration room so as to develop a corresponding voltage. The electrical circuitry constituting the temperature sensing means is subject to a reconstruction or reconstitution depending on the sort of selection signals supplied from the microcomputer. Specifically, when the microcomputer produces a first selection signal for rendering only the transistor $TR_1$ conductive in response to the first mode signal from the mode signal generation means, the temperature sensing means will be composed of a first voltage divider which includes a series connection of the thermistor resistor $R_{TH}$ and the resistor $R_1$, thereby developing at a junction $J_1$ between $R_{Th}$ and $R_1$ a voltage Va which corresponds to the actual temperature within the refrigeration room sensed at the first mode. When the microcomputer produces a second selection signal for rendering only the transistor $TR_2$ conductive in response to the second mode signal from the mode signal generation means, the temperature sensing means will be composed of a second voltage divider which includes a series connection of the thermistor resistor $R_{TH}$ and a series connection of the resistors $R_1$ and $R_2$, thereby developing at the junction $J_1$ between $R_{TH}$ and $R_1$ a voltage Vb which corresponds to the actual temperature within the refrigeration room sensed at the second mode. When the microcomputer produces a third selection signal for rendering only the transistor $TR_3$ conductive in response to the third mode signal from the mode signal generation means, the temperature sensing means will be composed of a third voltage divider which includes a series connection of the thermistor resistor $R_{TH}$ and a series connection of resistors $R_1$-$R_3$, thereby developing at the junction $J_1$ between $R_{TH}$ and $R_1$ a voltage $V_c$ which corresponds to the actual temperature within the refrigeration room sensed at the third mode. When the microcomputer produces a fourth selection signal for rendering all of the transistors $TR_1$-$TR_3$ nonconductive in response to the fourth mode signal from the mode signal generation means, the temperature sensing means will be composed of a fourth voltage divider which includes a series connection of the theremistor resistor $R_{TH}$ and a series connection of the resistors $R_1$-$R_4$, thereby developing at the junction $J_1$ between $R_{TH}$ and $R_1$ a voltage $V_d$ which corresponds to the actual temperature within the refrigeration room sensed at the fourth mode.

It should be understood that the thermistor resistor $R_{TH}$ is located within the refrigeration room, the resistance of which varies with the temperature fluctuation within the refrigeration room.

A reference voltage generation means comprising resistors $R_5$-$R_8$ as shown in FIG. 6 will develop at a junction $J_2$ between $R_5$ and $R_6$ a reference voltage $V_{ref}$ which corresponds to the reference temperature. The resistor $R_8$ is used to adjust the reference voltage $V_{ref}$ developed at the junction $J_2$.

A comparator means COMP serves to compare the voltage $V_a$, $V_b$, $V_c$, or $V_d$ applied to its inverting($-$) input terminal from the junction $J_1$ of the temperature sensing means, with the reference voltage $V_{ref}$ applied to its non-inverting($+$) input terminal from the junction $J_2$ of the reference voltage generation means. When the magnitude of the inverting input voltage is larger than that of the non-inverting input voltage, the comparator means provides a low level output(L) to an A2 port of the microcomputer. When the magnitude of the inverting input voltage is smaller than that of the non-inverting input voltage, a high level output(H) of the comparator means is supplied to the A2 port of the microcomputer.

A motor drive means which comprises transistors $TR_4$-$TR_7$ connected as shown in FIG. 6 is responsive to the control signals from the microcomputer to rotate the motor M (which corresponds to the motor 72 in FIG. 2) either in a forward or reverse direction or to deactivate the motor M. Specifically, when the microcomputer produces a forward rotation control signal for rendering only transistors $TR_4$ and $TR_6$ conductive, the motor M is rotated in the forward direction. When the microcomputer produces a reverse rotation control signal for rendering only transistors $TR_5$ and $TR_7$ conductive, the motor M is rotated in the reverse direction. When the microcomputer produces a deactivation control signal for rendering all of transistors $TR_4$-$TR_7$ non-conductive, the motor M is prevented from a further rotational movement. As used herein, the term "forward direction" means a direction in which the damper flap is opened up and the term "reverse direction" means a direction in which the damper flap is closed off.

A frequency generation means comprises an oscillator circuit which is provided with an inverter INT and a parallel resonance circuit which consists of a resistor $R_9$, a variable inductor L (which corresponds to the coil 54 in FIG. 3) and capacitors $C_1$ and $C_2$ connected one another as shown in FIG. 6. The frequency generation means provides to the A1 port of the microcomputer a frequency indicative of the opening angle of the damper flap. The frequency level produced by the frequency generation means varies with the inductance level of the variable inductor L which in turn depends on the rotational direction of the motor M. The frequency level increases as the motor M is subject to a forward rotation and vice versa.

The microcomputer typically includes a central processing unit(CPU), a memory(ROM) and an interface (input/output signal processing circuit). Although the present control device employs, as a microcomputer, TOSHIBA 47C 440AN commercially available from Toshiba Company of Japan, it is of course possible to use other types of microcomputer. The microcomputer serves to receive and then process output signals from the mode signal generation means, comparator means and frequency generation means in order to feed control signals to the temperature sensing means as well as the motor drive means.

The memory contained in the microcomputer functions to store the above-mentioned first to fourth selection signals which are to be used to reconstruct the circuitry of the temperature sensing means. The first to fourth selection signals are preset to correspond to each of the first to fourth mode signals from the mode signal generation means and are supplied to the temperature sensing means in response to the first to the fourth mode signals.

Figure 8:
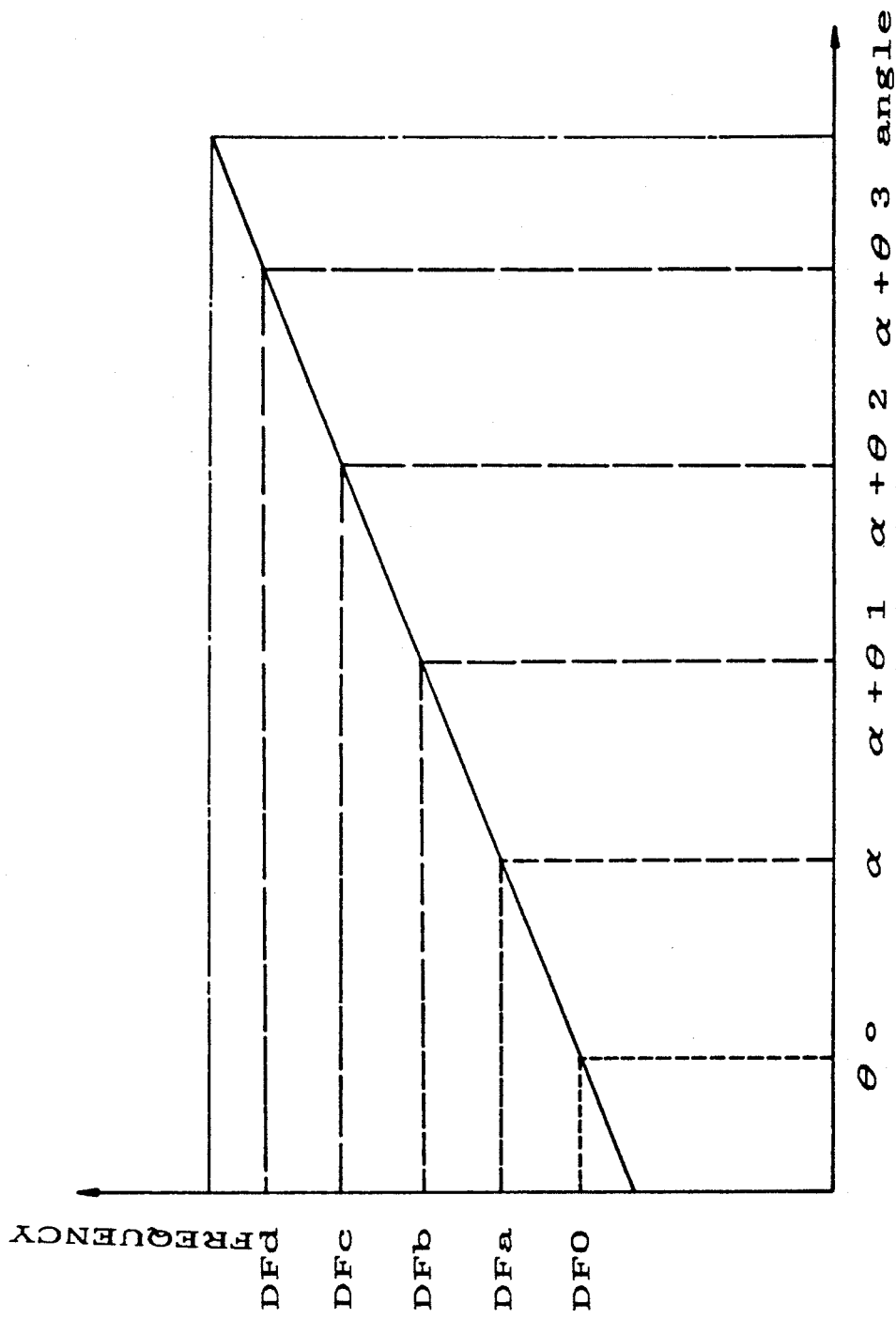
FIG. 8 shows a relationship between the reference opening angle of the damper flap and the corresponding frequency established on the basis of the reference opening angle.

Further, the memory will store a reference closure frequency $DF_Q$ which corresponds to the closure of the damper flap and reference opening frequencies $DF_a$, $DF_b$, $DF_c$ and $DF_d$ which correspond to the first to the fourth mode signals, respectively. The reference closure frequency $DF_o$ is indicative of a reference closure angle of the damper flap $\theta_o$. The reference opening frequencies $DF_a$, $Df_b$, $DF_c$ and $DF_d$ are indicative of the reference opening angles of the damper flap $\alpha$, $\alpha+\theta_1$, $\alpha+\theta_2$ and $\alpha+\theta_3$, respectively. Relationship between the reference frequencies and the reference angles is shown in FIG. 8, where $\theta_0<\alpha<\alpha+\theta_1<\alpha+\theta_2<\alpha+\theta_3$ and $DF_0<DF_a<DF_b<DF_c<DF_d$. These reference frequencies will be compared with the output frequency of the frequency generation means.

Moreover, the memory of the microcomputer is adapted for storage of the above-mentioned forward and reverse rotation control signals and the deactivation control signal. When the refrigeration room temperature is higher than the reference temperature, the forward rotation control signal is supplied to the motor drive means until the actual opening angle of the damper flap becomes equal to or larger than that of the reference opening angle of the damper flap. When the refrigeration room temperature is lower than the reference temperature without the danger flap being closed off, the reverse rotation control signal is supplied to the motor drive means so that the damper flap can be closed off. When the refrigeraton room temperature is higher than the reference temperature with the actual opening angle of the damper flap being equal to or greater than the reference opening angle of the damper flap or when the refrigeration room temperature is lower than the reference temperature with the damper flap closed off, the deactivation control signal is supplied to the motor drive means.

In accordance with the present invention, the microcomputer initially detects the operation mode selected by the user and then determines at the selected mode whether the refrigeraton room temperature is higher than the reference temperature. If so, the damper flap will be opened so that the actual opening angle thereof becomes equal to or larger than the reference opening angle corresponding to the selected mode. To the contrary, if the refrigeration room temperature is lower than the reference temperature, the damper flow will be closed until the actual opening angle thereof becomes equal to or smaller than the reference closure angle. These steps will be repeated to keep the refrigeraton room temperature constant.

Operation sequences performed by the microcomputer will now be described with reference to the flow chart illustrated in FIGS. 7A-7E.

If the refrigerator incorporating the novel temperature regulating apparatus is first connected to a power source, then the microcomputer will be reset to an initial state and begin to operate in step P1 shown on FIG. 7A.

Step P2 tests if the frequency output of the frequency generation means is equal to or lower than the reference closure frequency $DF_0$ which corresponds to the closure of the damper flap. If the test result in step P2 is NO, control is passed to step P3. If, the test result in step P2 is YES, control is passed to step P4.

In step P3, the reverse rotation of the motor M is effectuated through application of the reverse rotation control signal to the motor drive means. Control is then passed back to step P2.

In step P4, it is tested if a predetermined time (for example, 2 seconds) has elapsed. If the test result in step P4 is NO, control is passed to step P5. If the test result in step P4 is YES, control is passed to step P6.

In step P5, the reverse rotation of the motor M becomes operative. Control is then passed back to step P2.

In step P6, the rotation of the motor M is stopped through application of the deactivation control signal to the motor drive means. Thus, the damper flap is maintained at the reference closure angle $\theta_0$, which corresponds to the closure of the damper flap.

Step P7 tests if the mode signal generation means produces the fourth mode signal, i.e., if the switch SW4 is turned ON. If the test result in step P7 is YES, control passes to label "A" in FIG. 7B and proceeds with steps P8–P12 which are associated with the fourth mode. If the test result in step P7 is NO, control is passed to step P13.

Step P13 tests if the mode signal generation means produces the third mode signal, i.e., if the switch SW3 is turned ON. If the test result in step P13 is YES, control passes to label "B" in FIG. 7C and proceeds with steps P14–P18 which are associated with the third mode. If the test result in step P13 is NO, control is passed to step P19.

Step P19 tests if the mode signal generation means produces the first mode signal, i.e., if the switch SW1 is turned ON. If the test result in step P19 is YES, control passes to label "C" in FIG. 7D and proceeds with steps P20–P24 which are associated with the first mode. If the test result in step P19 is NO, control passes to label "D" in FIG. 7E and proceeds with steps P25–P29 which are associated with the second mode. The test result of NO in step P19 suggests that only the switch SW2 is turned ON or all of the switches SW1-SW4 are turned OFF.

Figure 7B:
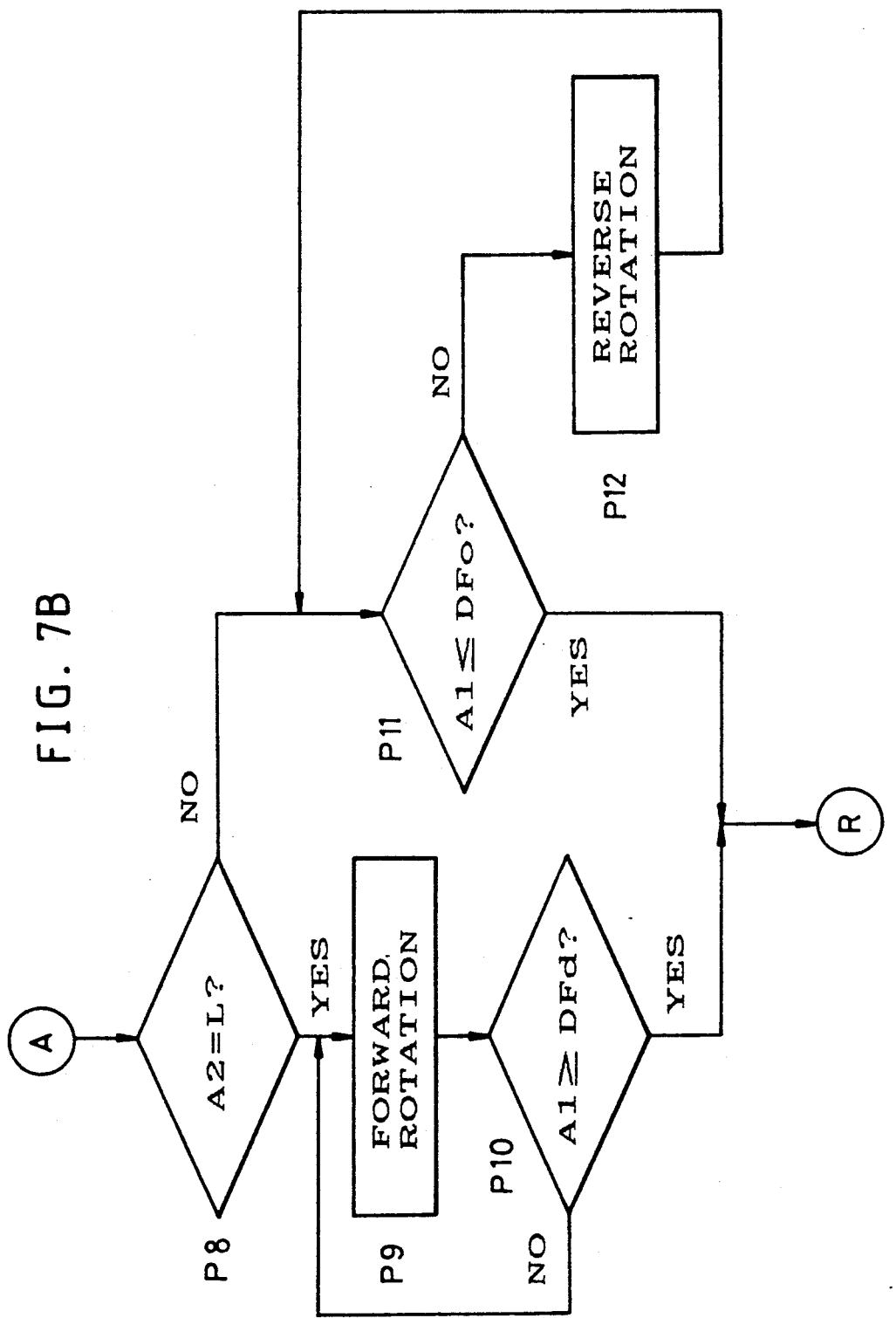
Figure 7C:
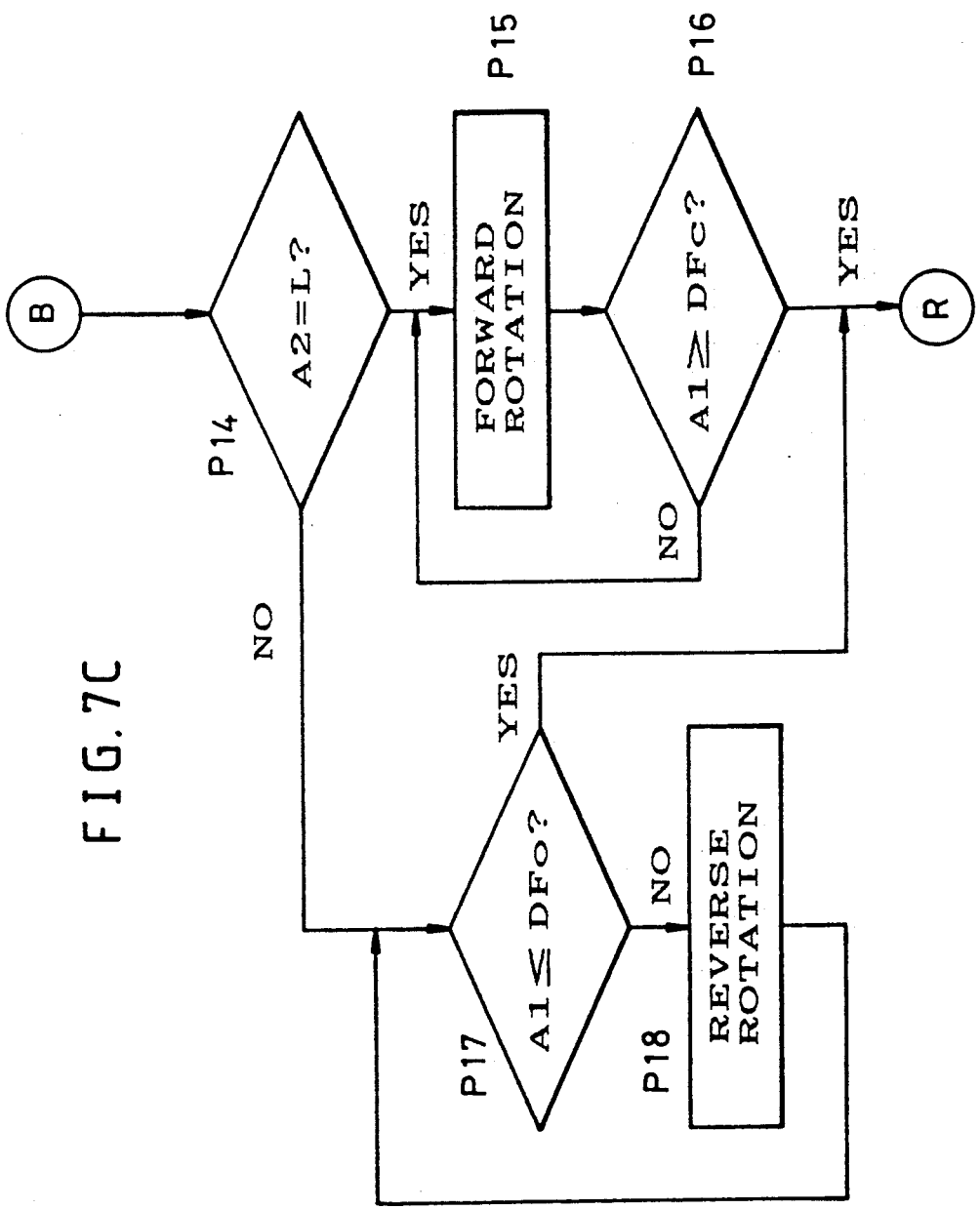
Figure 7D:
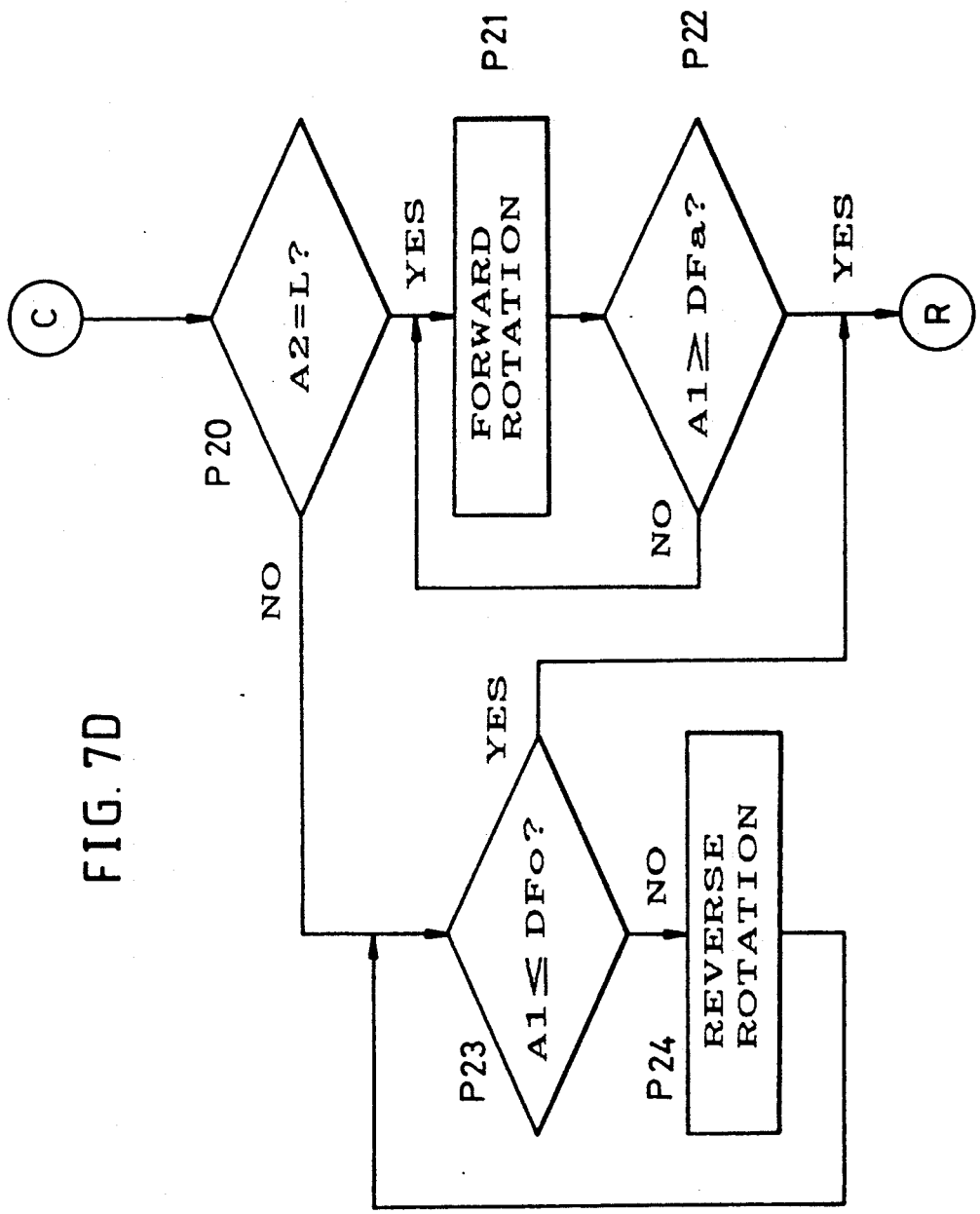
Figure 7E:
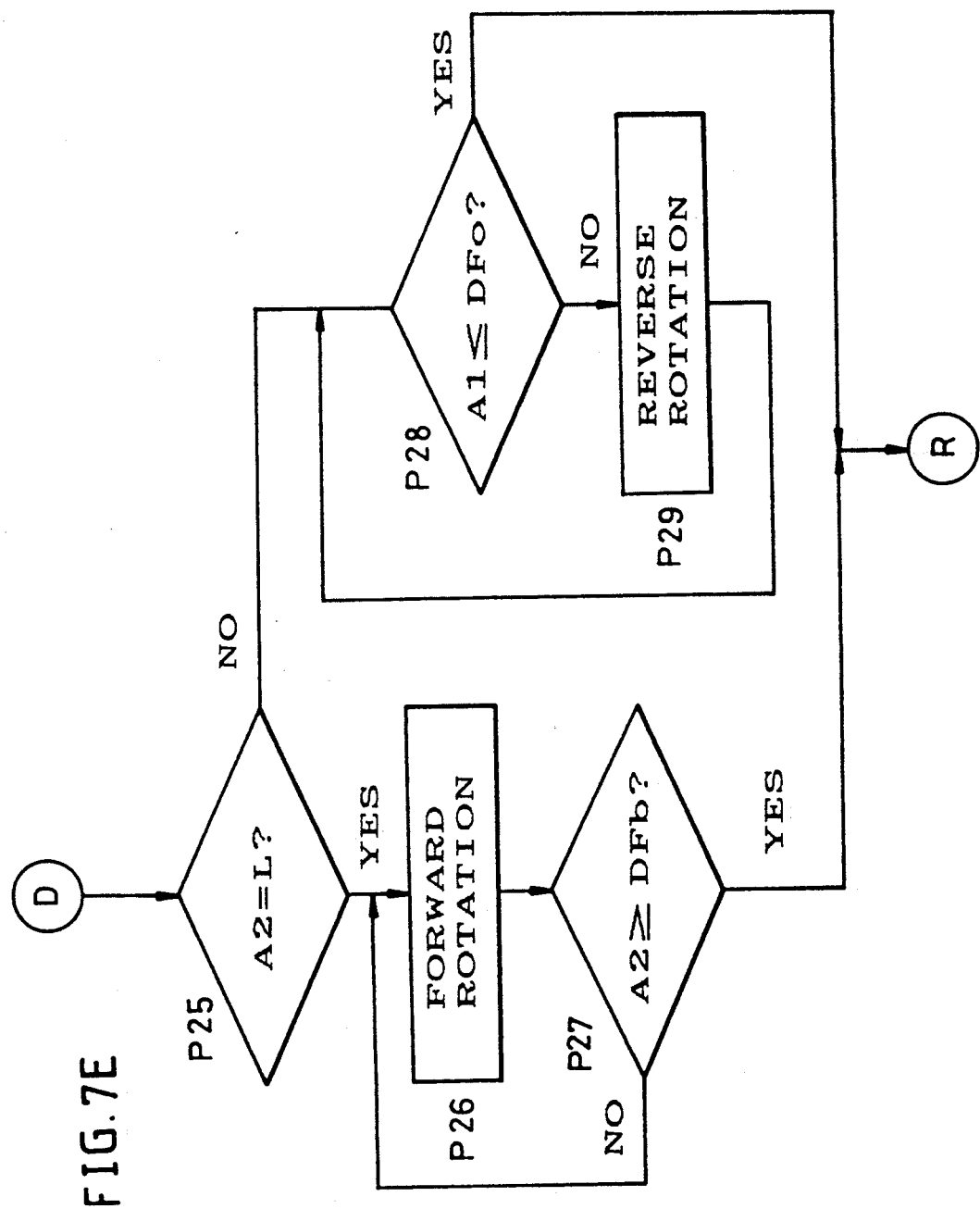

Given that the test result in step P19 is NO and thus control is passed to step P25 following the label "D" in FIG. 7E, step 25 tests if the low level (L) signal is fed to the A2 port of the microcomputer, i.e., if the inverting input voltage $V_b$ of the comparator COMP indicative of the sensed room temperature at mode 2 is higher than the non-inverting input reference voltage $V_{ref}$ of the comparator COMP.

If the test result in step 25 is YES, control is passed to step P26. If the test result in step 25 is NO, control is passed to step P28.

Step P28 tests if the frequency output of the frequency generation means is equal to or lower than the reference closure frequency $DF_0$. If the test result in step P28 is NO, control is passed to step P29 which causes the motor M to rotate in a reverse direction through application of the reverse rotation control signal to the motor drive means. Control is then passed back to step P28. If the test result in step P28 is YES, control returns to label "R" in FIG. 7A and repeats the steps P6, P7, P13, P19 and P25 until the test result in step P25 becomes YES.

In step P26, forward rotation of the motor M is effectuated through application of the forward rotation control signal to the motor drive means. Control is passed to step P27. Step 27 tests if the frequency output from the frequency generation means is equal to or higher than the reference opening frequency $DF_b$. If the test result in step P27 is NO, control is then passed back to step P26. If the test result in step P27 is YES, control returns to step P6 following label "R" in FIG. 7A. In step 6, the rotation of the motor M is stopped through application of the deactivation control signal to the motor drive means. Accordingly, the damper flap is maintained at the reference opening angle $\alpha + \theta_1$ and hence the damper flap actuator will be operated in mode 2.

It will now be described how the operation mode of the damper flap actuator is switched over from the second mode to the fourth mode.

Step P7 detects if the switch SW4 is turned ON. Control is then passed to P8.

Step P8 tests if a low level signal(L) is applied to the A2 port of the microcomputer. If the test results in step P8 is NO, i.e., if the comparator COMP produces a high level signal(H) indicating that the sensed voltage $V_d$ at mode 4 is lower than the reference voltage $V_{ref}$, control is passed to step P11. If the comparator COMP produces a low level signal(L) indicating that the sensed voltage $V_d$ is higher than the reference voltage $V_{ref}$, control is passed to step P9.

If it is detected, at step P8, that the sensed voltage $V_d$ is lower than the reference voltage $V_{ref}$ and thus the high level signal(H) is applied to the A2 port of the microcomputer, control passes to step P11. Step P11 tests if the frequency output from the frequency generation means is equal to or lower than the reference closure frequency $DF_0$. If the test result in step 11 is NO, control is passed to step P12 which causes the motor M to rotate in the reverse direction through application of the reverse rotation control signal to the motor drive means. Control is then passed back to step P11. If the test result in step P11 is YES, control returns to label "R" in FIG. 7A and repeats the steps P6, P7 and P8 until the test result in step P8 becomes YES.

If it is detected, at step P8, that the sensed voltage $V_d$ is higher than the reference voltage $V_{ref}$ and thus the low level signal(L) is applied to the A2 port of the microcomputer, control is passed to step P9 which causes the motor M to rotate in the forward direction through application of the forward rotation control signal to the motor drive means. Control is passed to step P10. Step P10 tests if the frequency output fed from the frequency generation means to the A1 port of the microcomputer is equal to or higher than the reference opening frequency $DF_d$. If the test result in step P10 is NO, control is then passed back to step P9. If the test result in step P10 is YES, control returns to step P6 following label "R" in FIG. 7A. In step 6, the motor M is deactivated through application of the deactivation control signal to the motor drive means. Accordingly, the damper flap is maintained at the reference opening angle $\alpha + \theta_3$ and therefore, the damper flap actuator will operate in mode 4.

Discussions relating to other types of switching operations for selection of a specific operation mode of the damper flap actuator, e.g., from mode 4 to mode 1, from mode 1 to mode 3 and so on will be omitted as they are virtually identical to the foregoing one.

While the best mode and preferred embodiment of the invention have been described herein, variations and changes may be made without departing from the scope and spirit of the invention.

What is claimed is:

1. An actuator for use in a temperature regulating apparatus of an air-circulated refrigerator, said refrigerator having a refrigeration room communicating with a cold air source through an inlet port formed on a wall of the refrigeration room, said inlet port being closed by an openable damper flap, which comprises:
- a housing having a bottom wall, a side wall and a cylindrical boss extending vertically upwardly from the bottom wall about half the height of the side wall, said side wall terminating at its top end;
- a guide member having a flanged cylinder and an axial bore formed through the flanged cylinder, said guide member mounted on the top end of the side wall so that the flanged cylinder can be in a concentrically spaced-apart relationship with the cylindrical boss of said housing;
- a core member slidably fitted into the axial bore of said guide member for a linear movement between a first position in which the damper flap closes off the inlet port and a second position in which the damper flap fully opens up the inlet port, said core member being operatively connected to the damper flap;
- a core driver for causing an axial movement of said core member between the first and the second positions;
- a coil wound around the flanged cylinder for generating an electrical position signal proportional to the axial displacement of said core member;
- means for generating an electrical temperature signal indicative of the actual temperature within said refrigeration room; and
- means responsive to the position and the temperature signals for controlling operation of said core driver to permit a controlled amount of cold air to flow into the refrigeration room.

2. An actuator as recited in claim 1, wherein said core driver comprises: a threaded shaft having a lower free end and an upper fixed end attached to said core member; a worm wheel having an internal thread and external teeth, said internal thread engaging with the threaded shaft, said worm wheel rotatably sandwiched between the cylindrical boss of said housing and the flanged cylinder of said guide member; a worm meshing with the external teeth of said worm wheel; and a motor for causing the worm to rotate in one or opposite direction.

3. An actuator as recited in claim 2, further comprising means for allowing the threaded shaft and the core member to move in an axial direction within a limited range while preventing their rotational movement.

4. An actuator as recited in claim 3, wherein said means for allowing said axial movement and preventing rotational movement comprises a radial tail extending radially outwardly from the lower free end of said threaded shaft and an axial slot formed along the cylindrical boss of said housing for accommodating said radial tail movably in an axial direction.

5. An actuator as recited in claim 4, wherein said core member is made of a permanent magnet.

6. A control device for controlling the operation of a damper flap actuator for use in a temperature regulating apparatus of an air-circulated refrigerator, said refrigerator having a refrigeration room communicating with a cold air source through an inlet port formed on a wall of the refrigeration room, the actuator being operatively connected to a damper flap and operable in a specific mode selected from multiple operation modes, said actuator comprising a motor means rotatable either in a first direction in which the damper flap is opened up or in a second direction in which the damper flap is closed off, which comprises:
- a mode signal generation means for producing a mode signal to select one of the operation modes;
- a mode recognizing means for receiving the mode signal to recognize the selected operation mode;
- a selection signal generation means responsive to the recognized mode to generate a selection signal which corresponds to the recognized mode;
- a temperature sensing means responsive to the selection signal for sensing the temperature within the refrigeration room at the recognized mode and generating a refrigeration room temperature voltage which corresponds to the sensed temperature, said temperature sensing means including a plurality of voltage dividers, each selectively operable in response to one of the multiple operation modes to produce the room temperature voltage signal;
- a reference voltage generation means for generating a reference voltage which corresponds to reference temperature;
- a computer means for comprising the refrigeration room temperature voltage with the reference voltage;
- a temperature deviation detector means responsive to an output of said comparator means for detecting a deviation in the refrigeration room temperature from the reference temperature;
- a reference frequency generation means responsive to an output of said temperature deviation detector means for generating a reference closure frequency which corresponds to the closure of the damper flap, when the refrigeration room temperature is lower than the reference temperature and for generating a reference opening frequency which corresponds to the recognized mode, when the refrigeration room temperature is higher than the reference temperature;
- a frequency generation means for generating an actual frequency indicative of an opening angle of the damper flap;
- an opening angle determination means for comparing the actual frequency with the reference closure or opening frequency to determine the opening angle of the damper flap;
- a motor drive control signal generation means responsive to outputs of said temperature deviation detector means and said opening angle determination means for generating, when the refrigeration room temperature is higher than the reference temperature, a first rotational direction control signal for causing the motor means to rotate in a first direction until the actual frequency becomes equal to or higher than the reference opening frequency and for generating, when the refrigeration room temperature is lower than the reference temperature and the actual frequency is higher than the reference closure frequency, a second rotational direction control signal for causing the motor means to rotate in a second direction until the actual frequency becomes equal to or lower than the reference closure frequency; and
- a motor drive means responsive to the control signal for rotating the motor means either in the first or the second direction.

7. A control device as recited in claim 6, wherein said mode signal generation means comprises a plurality of switches, said switches adapted to produce different mode signals when they are turned ON or OFF.

* * * * *